(12) United States Patent
Speier et al.

(10) Patent No.: US 7,610,463 B2
(45) Date of Patent: Oct. 27, 2009

(54) METHOD AND APPARATUS FOR PERFORMING AN ATOMIC SEMAPHORE OPERATION

(75) Inventors: Thomas Philip Speier, Holly Springs, NC (US); James Norris Dieffenderfer, Apex, NC (US); Richard Gerard Hofmann, Cary, NC (US); Thomas Andrew Sartorius, Raleigh, NC (US)

(73) Assignee: QUALCOMM Incorporated, San Diego, CA (US)

( * ) Notice: Subject to any disclaimer, the term of this patent is extended or adjusted under 35 U.S.C. 154(b) by 432 days.

(21) Appl. No.: 10/971,740

(22) Filed: Oct. 22, 2004

(65) Prior Publication Data

US 2006/0090051 A1   Apr. 27, 2006

(51) Int. Cl.
*G06F 12/00* (2006.01)
*G06F 13/00* (2006.01)
*G06F 13/28* (2006.01)
*G06F 12/14* (2006.01)
*G06F 13/22* (2006.01)

(52) U.S. Cl. ............... 711/163; 711/154; 710/200

(58) Field of Classification Search .......... 711/154, 711/163; 710/7, 20–21, 27, 107–108, 240–244, 710/200

See application file for complete search history.

(56) References Cited

U.S. PATENT DOCUMENTS

| 4,456,965 | A | | 6/1984 | Graber et al. |
| 4,594,657 | A | | 6/1986 | Byrns |
| 5,548,780 | A | * | 8/1996 | Krein .......................... 710/5 |
| 6,052,763 | A | * | 4/2000 | Maruyama .................. 711/152 |
| 6,513,089 | B1 | * | 1/2003 | Hofmann et al. ............. 710/309 |
| 6,587,905 | B1 | * | 7/2003 | Correale et al. ............. 710/107 |
| 6,745,274 | B1 | * | 6/2004 | Snyder et al. ............... 710/240 |
| 2002/0196669 | A1 | * | 12/2002 | Hsu et al. ............... 365/189.04 |
| 2004/0059818 | A1 | * | 3/2004 | Snyder et al. ............... 709/226 |
| 2006/0047919 | A1 | * | 3/2006 | Jenkins et al. .............. 711/150 |

* cited by examiner

*Primary Examiner*—Tuan V Thai
*Assistant Examiner*—Yaima Campos
(74) *Attorney, Agent, or Firm*—Peter M. Kamarchik; Nicholas J. Pauley; Sam Talpalatsky (57) ABSTRACT

A processing system and method of communicating within the processing system is disclosed. The processing system may include a bus; a memory region coupled to the bus; and a plurality of processing components having access to the memory region over the bus, each of the processing components being configured to perform a semaphore operation to gain access to the memory region by simultaneously requesting a read operation and a write operation to a semaphore location over the bus.

29 Claims, 4 Drawing Sheets

METHOD AND APPARATUS FOR PERFORMING AN ATOMIC SEMAPHORE OPERATION

BACKGROUND

1. Field

The present disclosure relates generally to processing systems employing a bus architecture, and more specifically, to methods and apparatuses for performing an atomic semaphore operation.

2. Background

Computers have revolutionized the electronics industry by enabling sophisticated processing tasks to be performed with just a few strokes of a keypad. These sophisticated tasks involve an incredibly high number of complex components that communicate with one another in a fast and efficient manner using a bus. A bus is a channel or path between components in a computer.

Many buses resident in a computer have traditionally been implemented as shared buses. A shared bus provides a means for any number of components to communicate over a common path or channel. In recent years, shared bus technology has been replaced to a large extent by point-to-point switching connections. Point-to-point switching connections provide a direct connection between two components on the bus while they are communicating with each other. Multiple direct links may be used to allow several components to communicate at the same time. A bus arbiter may be used to manage communications over the bus.

Conventional bus design includes independent and separate read, write, and address channels. A component granted access to the bus by the bus arbiter may perform a read or write operation by placing an address on the address channel and sending the appropriate read/write control signal using sideband signaling. When the component writes data to another component on the bus, it sends the data over the write channel. When the component reads data from another component on the bus, it receives the data over the read channel.

A computer implementing a bus architecture may include a number of processing components connected to memory. The memory may be divided into regions either by the system designer or dynamically during operation. Each processing component may have its own dedicated memory region. "Shared memory regions," on the other hand, are memory regions that may be accessed by multiple processing. A semaphore may be used to manage access to the shared memory regions. A "semaphore" is a hardware or software flag, residing in a shared memory location, that indicates the accessibility of a shared resource. A processing component that needs access to the shared memory region may read the semaphore to determine the accessibility of the shared memory region. If the semaphore indicates that the shared memory region is available, then the processing component may set the semaphore to indicate that the shared memory region is locked, and proceed to access the memory. The process of reading and setting the semaphore needs to be performed atomically. That is, no other processing component should be able to access the semaphore during this process.

Atomic access to the semaphore is not inherent with conventional bus protocols. Instead, it is a special case that is added to the bus protocol and often requires special hardware. The additional hardware increases the complexity of the bus arbiter and the processing components, and may result in added processing delay within the system. Accordingly, there is a need in the art to implement atomic access to the semaphore within the framework of the bus protocol with minimal additional hardware without degrading performance.

SUMMARY

In one aspect of the present invention, a processing system includes a bus; a memory region coupled to the bus; and a plurality of processing components having access to the memory region over the bus, each of the processing components being configured to perform a semaphore operation to gain access to the memory region by simultaneously requesting a read and write operation to a semaphore location over the bus.

In another aspect of the present invention, a processing system includes a bus; a memory region coupled to the bus; and a plurality of processing components having access to the memory region over the bus, each of the processing components having means for performing a semaphore operation to gain access to the memory region by simultaneously requesting a read and write operation to a semaphore location over the bus.

In yet another aspect of the present invention, a method of managing access to a memory region over a bus by a plurality of processing components may be performed. The method includes performing a semaphore operation by one of the processing components to gain access to the memory region, the semaphore operation being performed by simultaneously requesting a read and write operation to a semaphore location over the bus.

It is understood that other embodiments of the present invention will become readily apparent to those skilled in the art from the following detailed description, wherein various embodiments of the invention are shown and described by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF THE DRAWINGS

Aspects of the present invention are illustrated by way of example, and not by way of limitation, in the accompanying drawings, wherein.

DETAILED DESCRIPTION

The detailed description set forth below in connection with the appended drawings is intended as a description of various embodiments of the present invention and is not intended to represent the only embodiments in which the present invention may be practiced. The detailed description includes specific details for the purpose of providing a thorough understanding of the present invention. However, it will be apparent to those skilled in the art that the present invention may be practiced without these specific details. In some instances, well-known structures and components are shown in block diagram form in order to avoid obscuring the concepts of the present invention.

Figure 1:
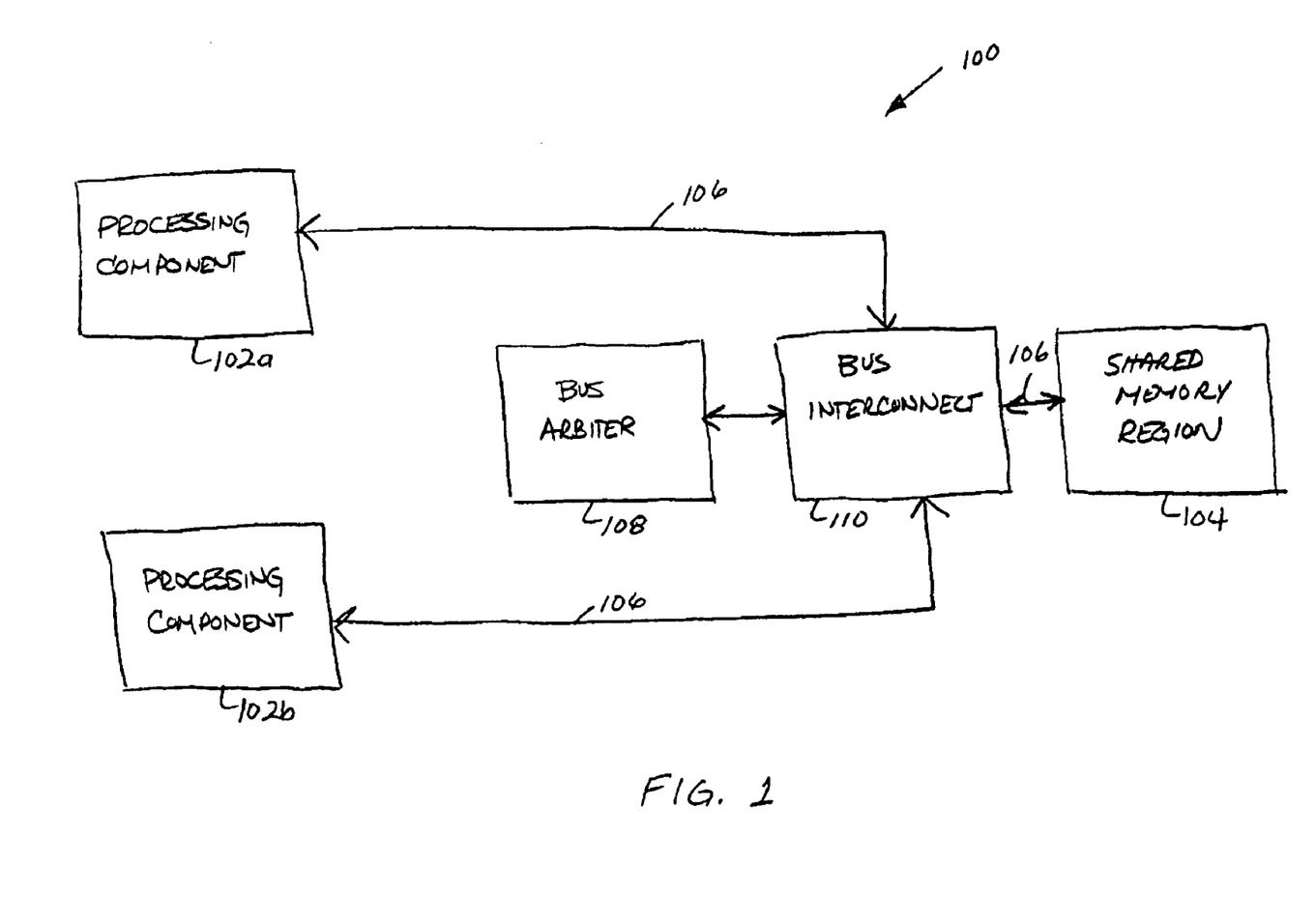
FIG. 1 is a conceptual block diagram illustrating an example of a processing system.

FIG. 1 is a conceptual block diagram illustrating an example of a processing system. The processing system 100 may be a computer, or resident in a computer, and capable of processing, retrieving and storing information. The processing system 100 may be a stand-alone system, or embedded in a device, such as a cellular telephone. As shown in FIG. 1, two processing components 102a and 102b within the processing system 100 may share a common resource 104 using a bus 106. Each processing component 102a and 102b may be any type of bus mastering component including, by way of example, a microprocessor, a digital signal processor (DSP), a bridge, programmable logic, discrete gate or transistor logic, or any other information processing component. The common resource 104 may be any type of bus slave component including, by way of example, a register, memory, a bridge, or any other component capable of retrieving and storing information. In the embodiment shown in FIG. 1, the common resource 104 is a region of memory. The term "memory region" refers to any memory device, any portion of a memory device, a memory map region, or the like.

A bus arbiter 108 may be used to manage access to the shared memory region 104. In one embodiment of the bus arbiter 108, a processing component 102a or 102b wanting access to the shared memory region 104 may broadcast a read or write request to the bus arbiter 108. The bus arbiter 108 may be used to configure a bus interconnect 110 to grant the requesting processing component 102a or 102b access to the shared memory region 104 to perform the read or write operation. In the event that multiple read and/or write requests from one or more processing components contend at the bus arbiter 108, the bus arbiter 108 may then determine the sequence in which the read and/or write operations will be performed and dynamically configure the interconnect 110 accordingly. The sequence of the read and/or write operations may be based on any bus arbitration scheme. The bus arbitration scheme may vary depending on the specific application and the overall design constraints, but generally will try to balance some kind of priority based grant system with a fairness scheme.

As an overlay to the bus arbitration scheme, a processing component 102a or 102b may perform a semaphore operation with the shared memory region 104 in an attempt to gain exclusive access to the shared memory region. The semaphore operation allows the processing component 102a or 102b to determine the status of the semaphore, and set the semaphore if the shared memory region 104 is available. In this particular example, the semaphore is stored in the shared memory region 104, but as those skilled in the art will appreciate, the semaphore may be stored anywhere in the processing system 100. The processing component 102a or 102b may perform the semaphore operation in several different ways. By way of example, a processing component 102a or 102b configured as a microprocessor may include software to perform the semaphore operation through a swap instruction. The swap instruction may be used to read the semaphore from the shared memory region 104 to a first internal register, and then store an updated semaphore from a second internal register to the semaphore location in the shared memory region 104. The updated semaphore may be a flag that indicates a lock for the shared memory region 104, which will always be true following a semaphore read operation because either the requesting processing component 102a or 102b acquires the lock, or the shared memory region 104 is already locked. This follows the test and set algorithm that is well known in the art.

The semaphore operation needs to be performed with an atomic read/write operation on the bus 106. One approach is to have the bus arbiter 108 lock the bus arbitration onto a single processing component during the semaphore operation. By way of example, a processing component 102a or 102b wanting to access the shared memory region 104 may perform the semaphore operation by requesting a locked read operation to determine the status of the semaphore followed by a request for a locked write operation to update the status of the semaphore. When the bus arbiter 106 detects a locked read operation request for the semaphore location, it grants the processing component 102a or 102b access to the shared memory region 104 through the bus interconnect 110, and locks bus arbitration by delaying all other read and/or write requests to the shared memory region 104 from all other bus mastering components until the processing component 102a or 102b updates the status of the semaphore.

The disadvantage of this approach is that it allows a processing component 102a or 102b to override the bus arbitration scheme decided upon by the system designer. This may negatively impact the performance of the processing system 100. Moreover, once the bus arbiter 106 locks the bus arbitration onto a processing component in response to a request to perform a semaphore operation, the bus arbiter 106 cannot restrict the processing component 102a or 102b to this operation. A processing component 102a or 102b could lock out other processing components arbitrarily because it does not think that it is getting the bandwidth it requires.

Another disadvantage of this approach is that it is a special case of the bus protocol, requiring additional hardware. This additional hardware may be eliminated if the semaphore operation could be performed atomically within the framework of the bus protocol. A bus protocol that could support an atomic semaphore operation would allow for the simultaneous request of a read and write operation. An example of a bus architecture implementing this protocol will now be described.

Figure 2:
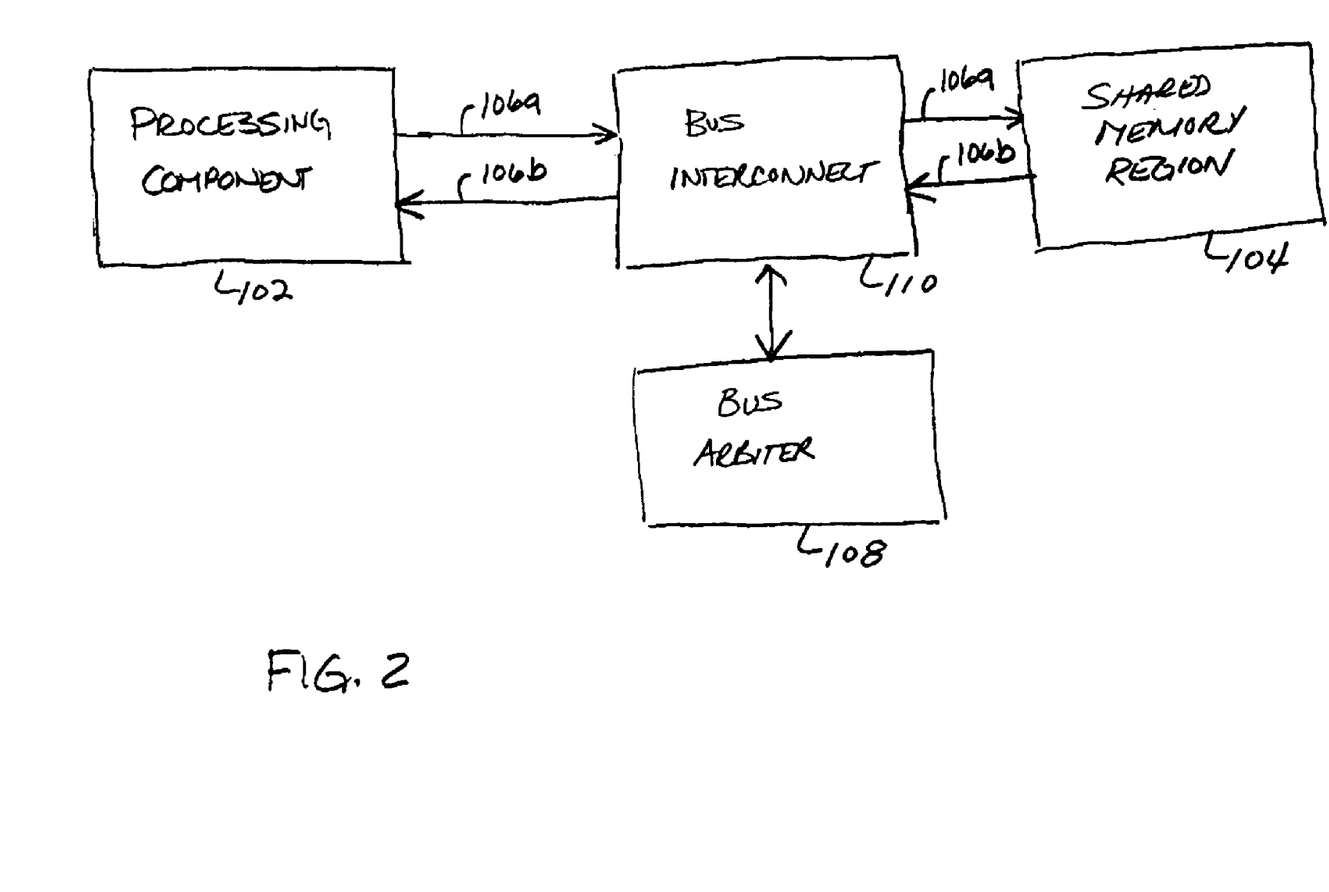
FIG. 2 is a conceptual block diagram illustrating an example of a point-to-point connection in a processing system between a processing component and a shared memory region over a bus.

FIG. 2 is a conceptual block diagram illustrating an example of a point-to-point connection in a processing system between a processing component and a shared memory region over a bus. The processing component 102 is granted access to the shared memory region 104 through the bus interconnect 110 under control of the bus arbiter 108. In this example, the complexity of the bus 106 may be reduced by eliminating the address channel that is used in conventional bus structures. The elimination of the address channel may be achieved by redefining the write channel as a "transmit channel" 106a. The transmit channel 106a may be used as a generic medium for broadcasting address information and write data from the processing component 102 to the shared memory region 104 in a time division multiplexed fashion. An example of this bus protocol is described in U.S. patent application entitled A Multiple Address Two Channel Bus Structure, Ser. No. 10/833,716, filed Apr. 27, 2004, the contents of which are incorporated herein by reference.

The processing component 102 may write to the shared memory region 104 by broadcasting an address on the transmit channel 106a, and at the same time, signaling a write operation to the shared memory region 104 using sideband signaling. Following the broadcast of the address, the processing component 102 may broadcast write data on the transmit channel 106a. The shared memory region 104 may store the write data in a block of memory beginning with the address previously broadcast on the transmit channel 106a.

The processing component 102 may read from the shared memory region 104 by broadcasting an address on the transmit channel 106a, and at the same time, signaling a read operation to the shared memory region 104 using sideband signaling. The shared memory region 104 may read data from a block of memory beginning with the address broadcast on the transmit channel 106a, and broadcast the read data to the processing component 102 over a receive channel 106b.

The bus protocol may be configured to support the broadcast of two different address locations over the transmit channel 106a to the shared memory region 104 at the same time. This concept is illustrated in the conceptual block diagram of FIG. 3. A point-to-point connection between the processing component 102 and the shared memory region 104 through the bus interconnect 110 under control of the bus arbiter 108 is shown. In this example, the upper portion of the transmit channel (Address A) may be used to access a first address location 104a of the shared memory region 104, and the lower portion of the transmit channel (Address B) may be used to access a second address location 104b of the shared memory region 104. With this configuration, the processing component 102 may request (1) two read operations simultaneously, (2) two write operations simultaneously, or (3) simultaneous read and write operations at the same or different addresses. One or more sideband signals may be associated with each of the addresses locations.

Figure 3:
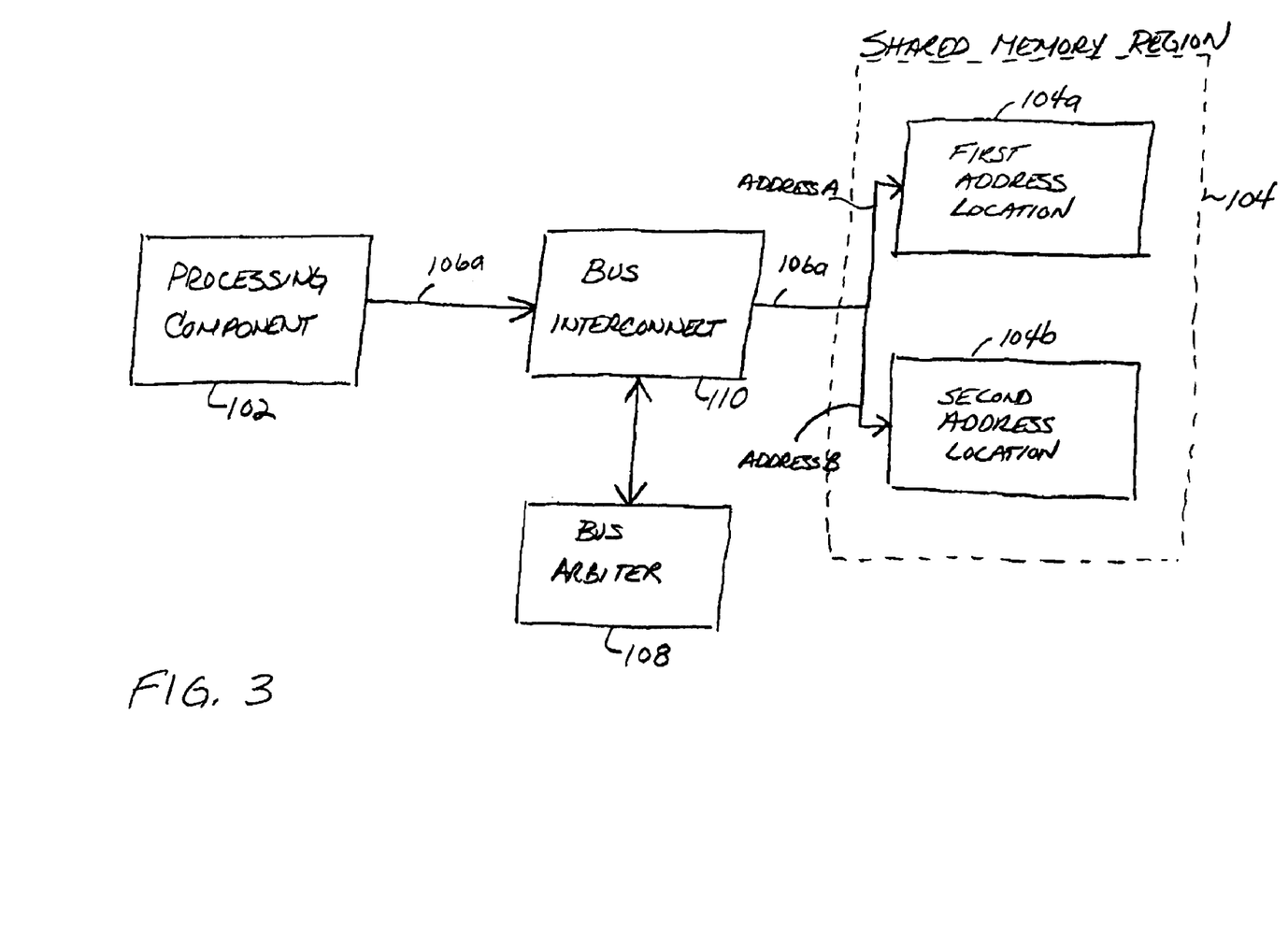
FIG. 3 is a conceptual block diagram illustrating an example of a bus protocol used in a processing system that supports the simultaneous broadcast of two different address locations to a shared memory region over a bus.

The bus protocol may use an implicit addressing scheme to handle simultaneous read and write operation requests to the same address. By way of example, the processing component 102 may broadcast the address for the first operation to be performed as Address A, and the address for the second operation to be performed as Address B. The read/write sequence performed by the shared memory region 104 may be based on this addressing scheme to maintain sequential consistency. Thus, if the same address is used for Address A and Address B, and the processing component 102 signals a write operation for Address A and a read operation for Address B, then the shared memory region 104 will wait until the write data broadcast on the transmit channel 106a is written to the shared memory region 104 before providing the newly written data at this address to the receive channel for transmission to the processing component 102. Conversely, if the processing component 102 signals a read operation for Address A, and a write operation for Address B, then the shared memory region 104 will provide the data at this address to the receive channel before writing the new data from the transmit channel 106a to this address in the shared memory region 104.

Figure 4:
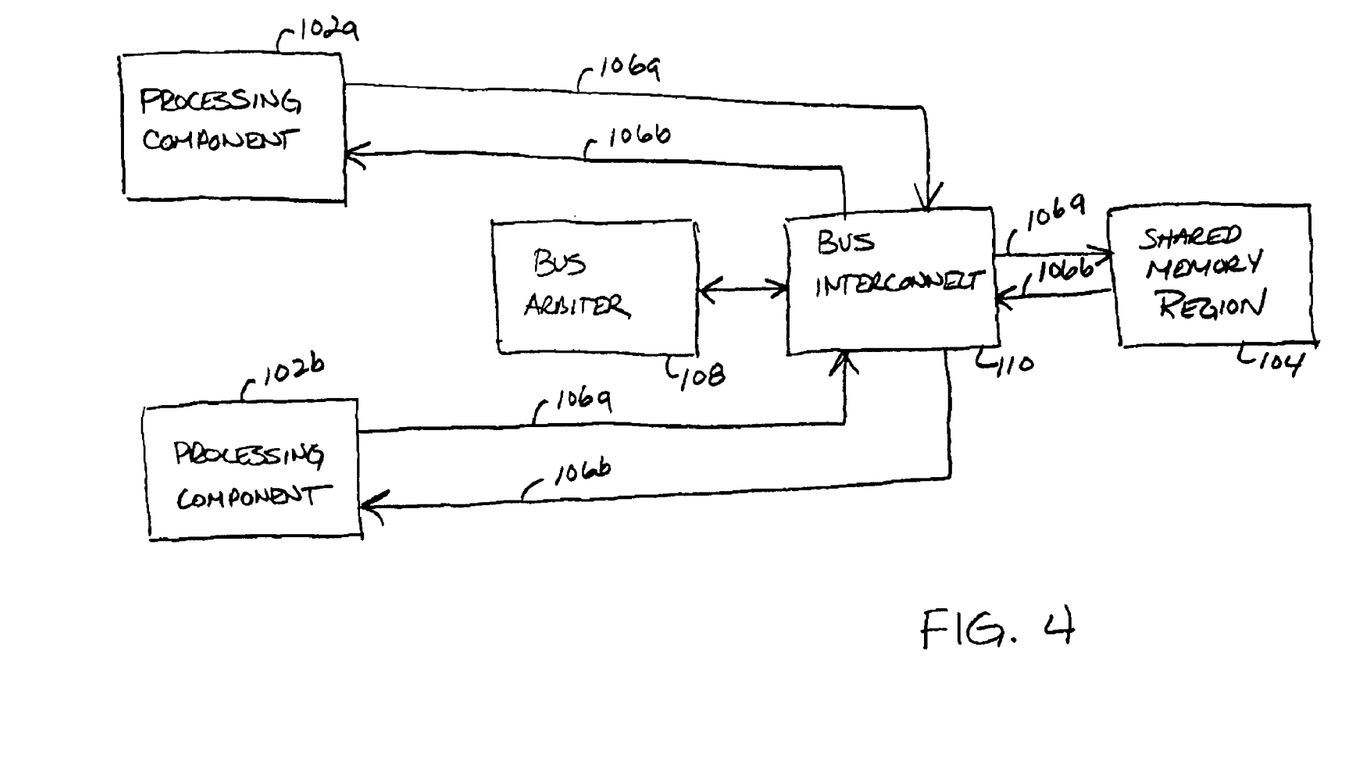
FIG. 4 is a conceptual block diagram illustrating an example of a processing system having a two channel bus architecture.

FIG. 4 is a conceptual block diagram illustrating an example of a processing system having a two channel bus architecture. The two channel bus structure may be supported by a bus protocol similar to that discussed in connection with FIGS. 2 and 3. In this example, an atomic semaphore operation may be performed within the framework of the bus protocol. More specifically, the processing component 102a may simultaneously request a read and write operation to the semaphore location. This may be achieved by broadcasting the address of the semaphore as both Address A and Address B on the transmit channel to the interconnect 110. If the bus protocol uses the implicit addressing scheme described above, then the processing component 102a signals a read operation for Address A and a write operation for Address B. Depending on the pending requests from other processing components, the bus arbiter 108 will make a decision as to whether the bus interconnect 110 should be immediately configured to grant the processing component 102a access to the shared memory region 104, or delay the connection. In any event, once the processing component 102a is granted access to the shared memory region 104, the read and write operation may be performed atomically. The bus arbiter 108 does not need to recognize the request as a semaphore operation and lock the shared memory region 104. Rather, the bus arbiter 108 merely grants the processing component 102a access to the shared memory region 104 in accordance with the bus arbitration scheme. If another processing component 102b performs a semaphore operation, the bus arbitration scheme may be used to manage access to the shared memory region 104, but the actual semaphore operation is invisible to the bus arbiter 108.

The atomic read and write operation for the semaphore operation may be performed once the bus arbiter 108 grants the processing component 102a access to the shared memory region 104. The semaphore address occupying both Address A and Address B on the transmit channel 106a, together with the associated signaling, may be routed through the bus interconnect 110 to the shared memory region 104. Following the broadcast of the semaphore address, the processing component 102a may broadcast an updated semaphore during the next clock cycle, which is also routed to the shared memory region 104 through the bus interconnect 110. The updated semaphore may be broadcast from an internal register in the processing component 102a using a swap instruction, or by any other means. A memory controller (not shown), which is either part of or separate from the shared memory region 104, determines the sequence in which the read and write operation will be performed based on the implicit addressing scheme discussed above, or any other method. In this case, the memory controller detects a read operation request for Address A and a write operation request for Address B, and as a result, determines that the read operation from the semaphore address will be performed first. The read operation is performed by retrieving the semaphore from the shared memory region 104 and broadcasting it over the receive channel 106b to the processing component 102a through the bus interconnect 110. Once the read operation is complete, the write operation is performed by writing the updated semaphore received over the transmit channel 106a to the semaphore address. The updated semaphore is a flag indicating that the shared memory region is locked, either by the processing component 102a as a result of the semaphore operation or previously by another bus mastering component.

The processing component 102a loads the semaphore broadcast from the shared memory region 104 over the receive channel 106b into an internal register, again using a swap instruction or by any other means. Once this occurs, the bus arbiter 108 is free to reconfigure the bus interconnect 110 to handle requests from other bus mastering components. The processing component 102a determines from the semaphore whether the shared memory region 104 is available. If the processing component 102a determines that the shared memory region 104 is unavailable (i.e., locked), then it will not attempt to read or write to the shared memory region 104. The processing component 102a may continue trying to perform semaphore operations until the shared memory region 104 becomes available later. If, on the other hand, the processing component 102a determines that the shared memory region 104 is available (i.e., unlocked), then it may read and write to the shared memory region 104 in accordance with the bus arbitration scheme implemented by the bus arbiter 108. Other bus mastering components will not attempt to read or write from the shared memory region 104 because they will detect a lock due to the updated semaphore written by the processing component 102a earlier. Once the processing component 102a no longer needs access to the shared memory region 104, it will perform a write operation to the semaphore location to change the flag to indicate that the shared memory region 104 is unlocked. Following this write operation, other bus mastering components may be able to access the shared memory region 104 through a successful semaphore operation.

The various illustrative logical blocks, modules, circuits, elements, and/or components described in connection with the embodiments disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing components, e.g., a combination of a DSP and a microprocessor, a plurality of microprocessors, one or more microprocessors in conjunction with a DSP core, or any other such configuration.

The methods or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the full scope consistent with the claims, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A processing system, comprising:
   a bus;
   a memory region coupled to the bus; and
   a plurality of processing components having access to the memory region over the bus, each of the processing components being configured to perform a semaphore operation to gain access to the memory region by simultaneously requesting a read and write operation to a same semaphore address over the bus,
   wherein the bus is configured to send multiple instances of the same semaphore address in the same cycle.

2. The processing system of claim 1 wherein each of the processing components is further configured to request the read and write operation for the semaphore operation by simultaneously broadcasting two copies of a semaphore address to the semaphore location over the bus.

3. The processing system of claim 2 wherein each of the processing components is further configured to request the read and write operation for the semaphore operation by providing a read operation request signal to the semaphore location with one copy of the semaphore address, and providing a write operation request signal to the semaphore location with the other copy of the semaphore address.

4. The processing system of claim 2 wherein each of the processing components is further configured to perform the semaphore operation by broadcasting an updated semaphore to the semaphore location following the simultaneous broadcast of the two copies of the semaphore address.

5. The processing system of claim 4 wherein the semaphore location is configured to retrieve the semaphore in response to the read operation request to the semaphore address from one of the processing components, and broadcast the retrieved semaphore to said one of the processing components, the semaphore location further being configured to store the updated semaphore in response to the write operation request to the semaphore address.

6. The processing system of claim 5 wherein the bus further comprises a transmit channel and a receive channel, and wherein each of the processing components is further configured to broadcast the two copies of the semaphore address, followed by the updated semaphore, to the semaphore location over the transmit channel, and wherein the semaphore location is further configured to broadcast the retrieved semaphore to said one of the processing components over the receive channel.

7. The processing system of claim 6 each of the processing components is further configured to determine whether the memory region is available from the retrieved semaphore broadcast over the received channel.

8. The processing system of claim 7 wherein each of the processing components is further configured to write data to the memory region, if the memory region is determined to be available, by broadcasting a write data address and the write data to the memory region over the transmit channel, and wherein each of the processing components is further configured to read data from the memory region, if the memory region is determined to be available, by broadcasting a read data address to the memory region over the transmit channel and reading the read data from the receive channel.

9. The processing system of claim 2 wherein the bus comprises a transmit channel having a plurality of lines, and wherein each of the processing components is further configured to request the read and write operation for the semaphore operation by broadcasting one copy of the semaphore address over a first portion of the lines and the other copy of the semaphore address over a second portion of the lines.

10. The processing system of claim 9 wherein each of the processing components is further configured to provide a read operation request signal with said one of copy of the semaphore address on the first portion of the lines, and a write operation request signal with said other copy of the semaphore address on the second portion of the lines.

11. The processing of claim 10 wherein the semaphore location is further configured to perform the read operation requested before performing the write operation requested.

12. The method of claim 1, wherein the simultaneously requested read and write operations do not indicate an atomic operation.

13. The method of claim 1, wherein the simultaneously requested read and write requests are sent over a single channel.

14. The method of claim 1, wherein the simultaneous request of the read and write operation to the same semaphore address is performed by including multiple instances of the same semaphore address within the same cycle with associated sideband signaling indicating that one of the multiple instances of the same semaphore address corresponds to a write operation and another of the multiple instances of the same semaphore address corresponds to a read operation.

15. A processing system, comprising:
    a bus;
    a memory region coupled to the bus; and
    a plurality of processing components having access to the memory region over the bus, each of the processing components having means for performing a semaphore operation to gain access to the memory region by simultaneously requesting a read and write operation to a same semaphore address over the bus,
    wherein the bus is configured to send multiple instances of the same semaphore address in the same cycle.

16. The method of claim 15, wherein the simultaneously requested read and write operations do not indicate an atomic operation.

17. A method of managing access to a memory region over a bus by a plurality of processing components, the method comprising:
    performing a semaphore operation by one of the processing components to gain access to the memory region, the semaphore operation being performed by simultaneously requesting a read and write operation to a same semaphore address over the bus,
    wherein the bus is configured to send multiple instances of the same semaphore address in the same cycle.

18. The method of claim 17 wherein the read and write operation requests for the semaphore operation comprises broadcasting two copies of a semaphore address from said one of the processing components to the semaphore location over the bus.

19. The method of claim 18 wherein the read and write operation requests for the semaphore operation further comprises providing from said one of the processing components a read operation request signal to the semaphore location with one copy of the semaphore address, and providing from said one of the processing components a write operation request signal to the semaphore location with the other copy of the semaphore address.

20. The method of claim 18 wherein the performance of the semaphore operation by said one of the processing components comprises broadcasting an updated semaphore to the semaphore location over the bus following the simultaneous broadcast of the two copies of the semaphore address.

21. The method of claim 18 further comprising retrieving the semaphore from the semaphore location in response to the read operation request to the semaphore address by said one of the processing components, broadcasting the retrieved semaphore from the semaphore location to said one of the processing components over the bus, and storing the updated semaphore at the semaphore location in response to the write operation request to the semaphore address.

22. The method of claim 21 wherein the bus further comprises a transmit channel and a receive channel, and wherein said one of the processing components broadcasts the two copies of the semaphore address, followed by the updated semaphore, to the semaphore location over the transmit channel, and wherein the semaphore location broadcasts the retrieved semaphore to said one of the processing components over the receive channel.

23. The method of claim 22 further comprising determining at said one of the processing components whether the memory region is available from the retrieved semaphore.

24. The method of claim 23 wherein said one of the processing components determines that the memory region is available, the method further comprising writing data to the memory region by broadcasting a write data address and the write data from said one of the processing components to the memory region over the transmit channel.

25. The method of claim 23 wherein said one of the processing components determines that the memory region is available, the method further comprising reading data from the memory region by broadcasting a read data address from said one of the processing components to the memory region over the transmit channel, and broadcasting the read data from the memory region to said one of the processing components.

26. The method of claim 18 wherein the bus comprises a transmit channel having a plurality of lines, and wherein each of the processing components is further configured to request the read and write operation for the semaphore operation by broadcasting one copy of the semaphore address over a first portion of the lines and the other copy of the semaphore address over a second portion of the lines.

27. The method of claim 26 further comprising providing a read operation request signal to the semaphore location with said one of the copies of the semaphore address on the first portion of the lines, and providing a write operation request signal with said other copy of the semaphore address on the second portion of the lines.

28. The method of claim 17, wherein the simultaneously requested read and write operations do not indicate an atomic operation.

29. A computer-readable medium comprising instructions, which, when executed by a processing system having a bus, a memory region and a plurality of processing components, cause the processing system to perform operations, the instructions comprising:
    program code to perform a semaphore operation by one of the processing components to gain access to the memory region, the semaphore operation being performed by simultaneously requesting a read and write operation to a same semaphore address over the bus,
    wherein the bus is configured to send multiple instances of the same semaphore address in the same cycle.

* * * * *

UNITED STATES PATENT AND TRADEMARK OFFICE
CERTIFICATE OF CORRECTION

| | | |
|---|---|---|
| PATENT NO. | : 7,610,463 B2 | |
| APPLICATION NO. | : 10/971740 | |
| DATED | : October 27, 2009 | |
| INVENTOR(S) | : Speier et al. | |

It is certified that error appears in the above-identified patent and that said Letters Patent is hereby corrected as shown below:

Column 8, line 37, claim 7: "of claim 6 each" to read as --of claim 6 wherein each--

Column 8, line 61, claim 10: "one of copy" to read as --one copy--

Column 9, line 40, claim 18: "comprises" to read as --comprise--

Column 9, line 45, claim 19: "comprises" to read as --comprise--

Signed and Sealed this
Twenty-first Day of June, 2011

David J. Kappos
*Director of the United States Patent and Trademark Office*